United States Patent [19]

Balkcum et al.

[11] Patent Number: 5,354,174

[45] Date of Patent: * Oct. 11, 1994

[54] BACKBONE SUPPORT STRUCTURE FOR COMPRESSOR

[75] Inventors: James T. Balkcum; Jack W. Wilson, Jr., both of West Palm Beach, Fla.

[73] Assignee: United Technologies Corporation, Hartford, Conn.

[*] Notice: The portion of the term of this patent subsequent to Jun. 2, 2009 has been disclaimed.

[21] Appl. No.: 19,801

[22] Filed: Nov. 9, 1992

Related U.S. Application Data

[63] Continuation of Ser. No. 581,228, Sep. 12, 1990, abandoned.

[51] Int. Cl.⁵ .............................................. F04D 29/60
[52] U.S. Cl. .................................. 415/209.2; 415/189
[58] Field of Search ..................... 415/115, 116, 182.1, 415/209.2, 189, 190; 60/39.31

[56] References Cited

U.S. PATENT DOCUMENTS

| | | | |
|---|---|---|---|
| 3,427,000 | 2/1969 | Scalzo | 415/115 |
| 3,558,237 | 1/1971 | Wall, Jr. | 415/134 |
| 4,015,910 | 4/1977 | Harmon et al. | 415/209.2 |
| 4,213,738 | 7/1980 | Williams | 415/115 |
| 4,314,791 | 2/1982 | Weiler | 415/115 |
| 4,720,236 | 1/1988 | Stevens | 415/116 |
| 5,118,253 | 6/1992 | Balkcum, III | 415/209.2 |
| 5,127,797 | 7/1992 | Carman | 415/209.2 |
| 5,131,811 | 7/1992 | Johnson | 415/209.2 |
| 5,180,281 | 1/1993 | Burge et al. | 415/209.2 |
| 5,224,824 | 7/1993 | Eng | 415/209.2 |

*Primary Examiner*—John T. Kwon
*Attorney, Agent, or Firm*—Norman Friedland

[57] ABSTRACT

The backbone which is a load carrying support member of the aft end of the compressor of a gas turbine engine is fabricated from an annular disk-like element that is generally straight in cross section. The points of attachment permit circumferential thermal growth with radial restraint and snugness at judicious locations for minimizing scrubbing of the case-tied segmented inner stator case.

5 Claims, 3 Drawing Sheets

BACKBONE SUPPORT STRUCTURE FOR COMPRESSOR

The invention was made under a U.S. Government contract and the Government has rights herein.

This is a continuation of Ser. No. 07/581,228 filed Sep. 12, 1990, now abandoned.

CROSS REFERENCE

The subject matter of this application is related to the subject matter of the following commonly assigned patent applications: U.S. application Ser. No. 581,223 entitled "Fastener For Multi-Stage Compressor"; U.S. Application Ser. No. 581,224 entitled "Fastener Mounting For Multi-Stage Compressor" issued as U.S. Pat. No. 5,131,811; U.S. application Ser. No. 581,231 entitled "Case Tying Means For A Gas Turbine Engine" issued as U.S. Pat. No. 5,180,281; U.S. Application Ser. No. 581,230 entitled "Compressor Bleed" issued as U.S. Pat. No. 5,203,162; U.S. application Ser. No. 581,229 entitled "Segmented Stator Vane Seal" issued as U.S. Pat. No. 5,158,430; U.S. application Ser. No. 581,227 entitled "Compressor Case Construction With Backbone" issued as U.S. Pat. No. 5,118,253; U.S. application Ser. No. 581,219 entitled "Compressor Case Construction" issued as U.S. Pat. No. 5,224,824; U.S. application Ser. No. 581,240 entitled "Compressor Case Attachment Means" issued as U.S. Pat. No. 5,127,797; U.S. application Ser. No. 581,220 entitled "Compressor Case With Controlled Thermal Environment" issued as U.S. Pat. No. 5,127,794; all of the above filed on even date herewith.

TECHNICAL FIELD

This invention relates to gas turbine engines and more particularly to the construction of the compressor section.

BACKGROUND ART

As is well known, the compressor case of a gas turbine engine powering aircraft is subjected to severe pressure and temperature loadings throughout the engine operating envelope and care must be taken to assure that the components remain concentric while maintaining relatively close running clearances so as to avoid inadvertent rubs. Inasmuch as the engine case is thin relative to the rotor and stator components in the compressor section, it responds more rapidly to temperature changes than do other components. This is particularly true during periods of transient engine performance. Typical of these transients are throttle chops, throttle bursts, and the like. Obviously it is customary to provide sufficient clearances during these transients to assure that the rotating parts do not interfere with the stationary parts.

The problem becomes even more aggravated when the engine case is fabricated in two halves (split case) which is necessitated for certain maintenance and construction reasons. Typically, the halves are joined at flanges by a series of bolts and the flanges compared to the remaining portion of the circumference of the case is relatively thick and hence does not respond to thermal and pressure changes as quickly as the thinner portion of the case. The consequence of this type of construction is that the case has a tendency to grow eccentrically or out of round.

In certain instances, in order to attain adequate roundness and concentricity and to achieve desired clearance between the rotating and non-rotating parts, it was necessary to utilize a full hoop case for the highest stages of a multiple stage compressor. Since the stator components, i.e., stator vanes and outer air seals, are segmented the problem was to assure that the compressor maintained its surge margin notwithstanding the fact that the outer case would undergo large deflection at acceleration and deceleration modes of operation. The cavity that exists between the outer case and the inner case formed by the segmented stator components, being subjected to pressures occasioned by the flow of engine air through the various leakage paths, presented a unique problem. In the event of a surge, which is a non-designed condition, the pressure in the gas path would be reduced significantly. Because the air in the cavity is captured and cannot be immediately relieved, it would create an enormous pressure difference across the stator components, cause them to distort, with a consequential rubbing of the compressor blades, and a possible breakage.

In order to withstand this pressure loading and yet achieve the roundness and clearance control of the stationary and rotating components, it was necessary to incorporate a mechanism that would tie the outer case to the segmented stator components. While it became important to assure that this rubbing did not occur, particularly where severe rubbing could permanently damage the blades and/or rotor/stator during surge, the mechanism that is utilized must be capable of withstanding this enormous load, yet be insensitive to fatigue.

Moreover, in order to achieve roundness and maintain close tolerance between the tips of the blades and outer air seal, it is abundantly important that the components subjected to high thermal and load differentials do not allow the outer and inner cases to grow eccentrically. Conventionally, the inner segmented case at the last stage of the compressor is supported to the outer case by an annular, wish-bone shaped bulkhead. Applicable flanges formed on both cases are suitably bolted to cooperating flanges on the wish-bone element. This construction is shown in FIG. 1, which exemplifies a prior art construction showing a typical axially split outer case carrying flange 6 bolted to wish-bone support member 7. Each of the circumferential segments 8 (only one shown) carries flange 9 which is likewise bolted to the wish-bone support member 7. The wish-bone configuration provides relative flexibility between the outer case 5 which is relatively cool and the inner case 8 which is relatively hot since the outer case sees cooler fan air and the inner case sees engine gas path air. It is apparent from the foregoing that this construction allows for any distortion to be taken up by the flexibility provided by the wish-bone configuration.

In the circumferential direction, the segments 8 are bolted to the wish-bone element 7 to form a rigid, almost unitary assembly and the growth, due to loads and thermals, is taken up by the characteristics inherent in the wish-bone shape of element 7. In heretofore designs, each segment included at least three circumferentially equispaced bolts.

By those considered experts in this field of technology, this type of bulkhead construction, sometimes referred to as the backbone, was the only suitable way to compensate for the high loads and temperature ranges at this location of the engine and yet meet acceptable low cycle fatigue (LCF) specifications.

We have found that we can achieve acceptable LCF life, obtain a less complicated and lower weight backbone construction and eliminate the costly wish-bone shaped element. To this end, a relatively straight shaped annular backbone supports the inner segmented case to the outer case. This arrangement enhances the control of the clearances between the tips of the blades and outer air seal.

STATEMENT OF THE INVENTION

An object of this invention is to provide an improved structural support for the aft end of the high pressure compressor of a gas turbine engine.

A feature of this invention is the use of a judiciously annular-shaped straight backbone support to axially, and radially locate the stator segments. This configuration controls tip clearance by allowing the stator segments to be positioned radially by the more thermally isolated cases. This more closely matches the rotor growth which has relatively slow thermal response.

Another feature of this invention is to provide an interference fit between the backbone support structure and its attachment to prevent or reduce thermal scrubbing of the assembly.

The foregoing and other features and advantages of the present invention will become more apparent from the following description and accompanying drawings.

BEST MODE FOR CARRYING OUT THE INVENTION

Figure 1:
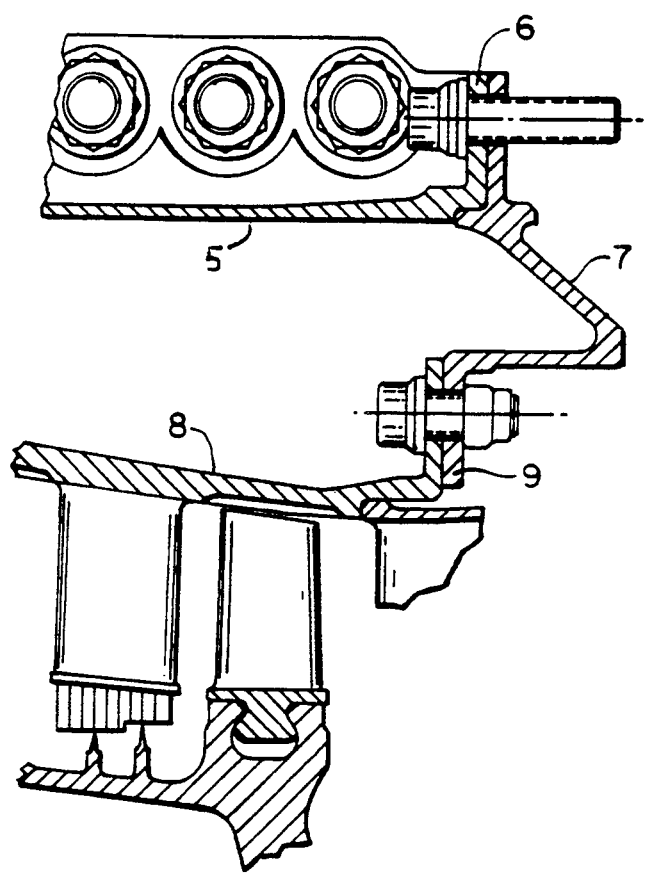
FIG. 1 is a partial view, partly in sections and partly in elevation showing the backbone construction of a prior art compressor for a gas turbine engine.
Figure 2:
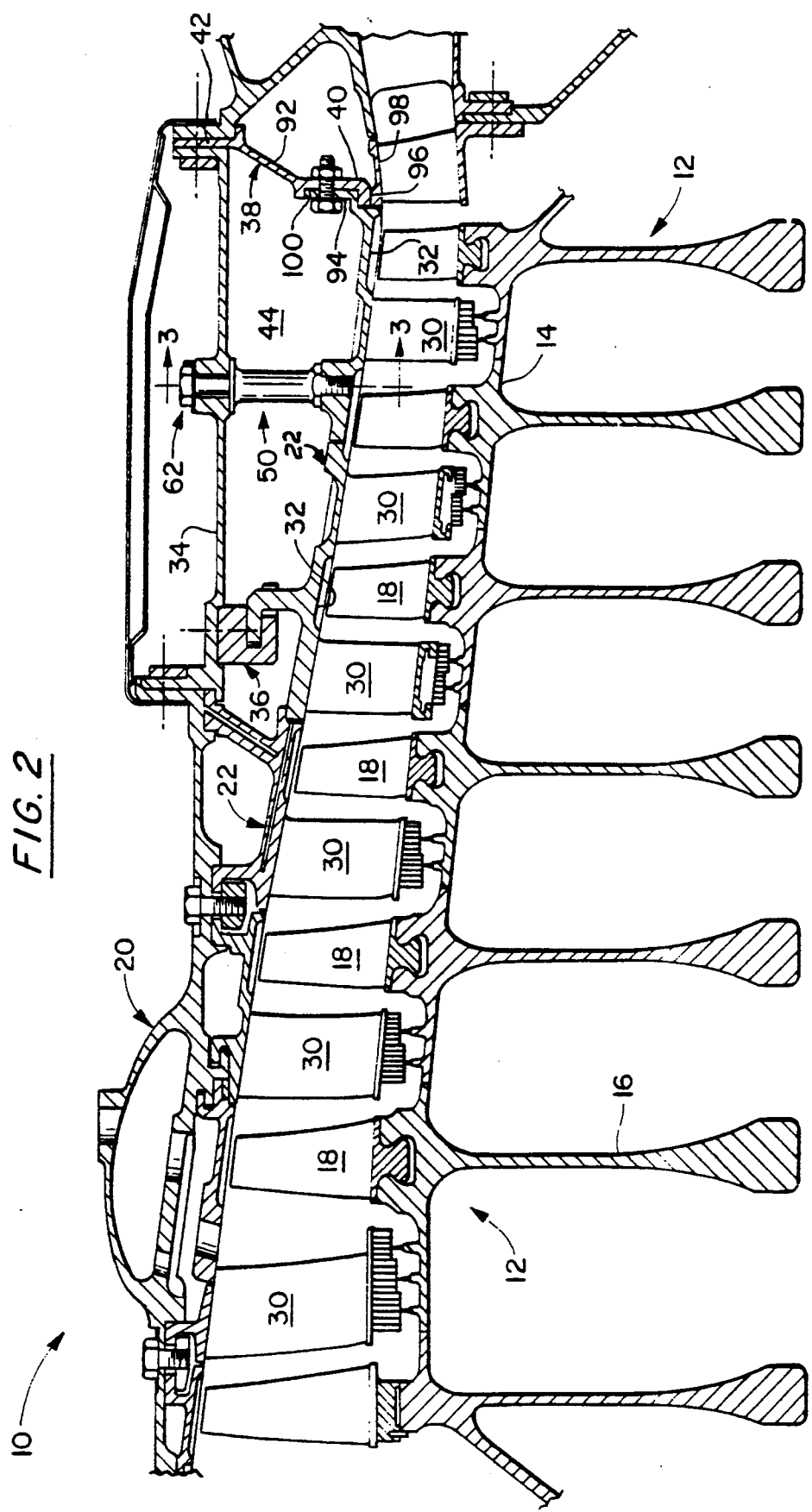
FIG. 2 is a partial view partly in section and partly in elevation of a multi-stage axial flow compressor for a gas turbine engine.
Figure 3:
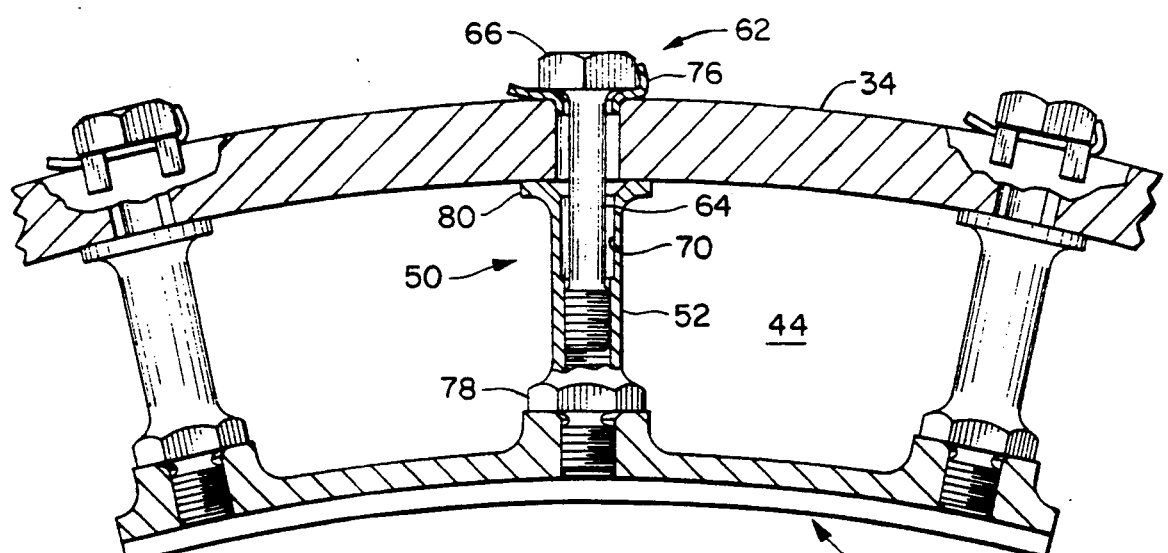
FIG. 3 is a partial sectional view partly in schematic taken along lines 3—3 of FIG. 2 showing one of several segments of the components making up the inner case.
Figure 4:
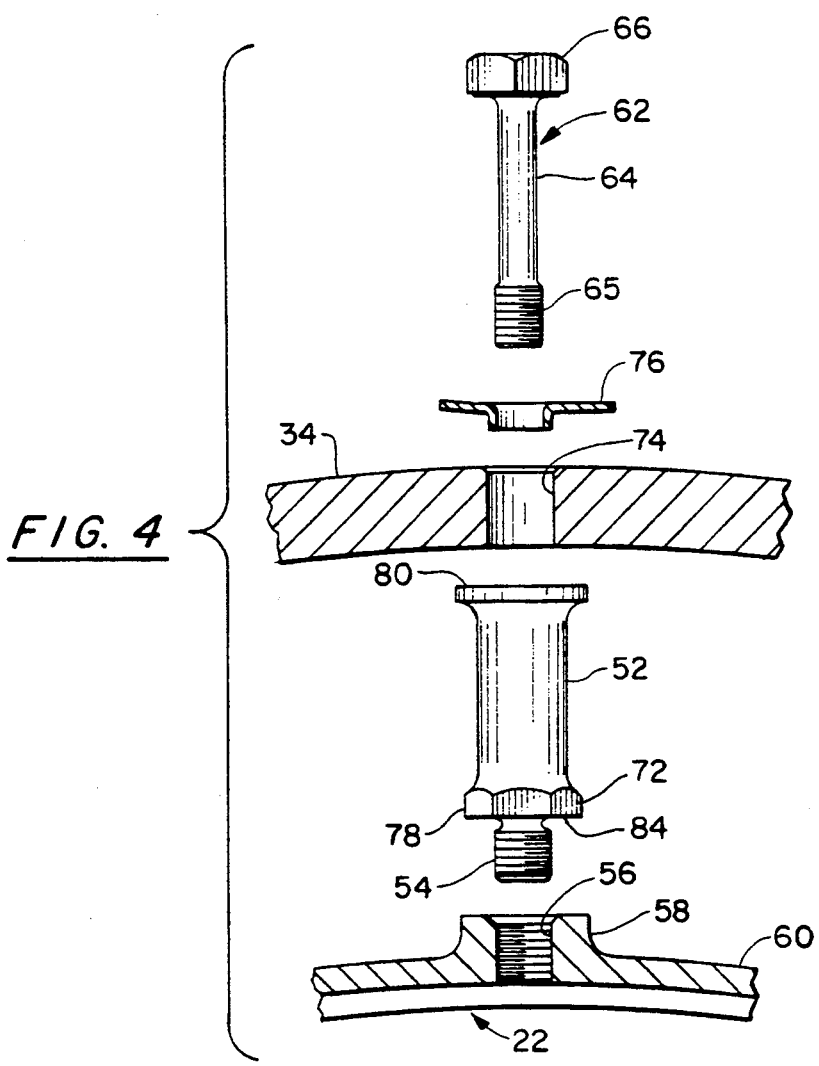
FIG. 4 is an exploded view showing the details of the spool/bolt.

To best understand this invention reference is made to FIGS. 2, 3 and 4 showing part of a multi-stage compressor for a gas turbine engine of the type for powering aircraft. For more details of a gas turbine engine, (the F100 family of engines manufactured by Pratt & Whitney, a division of United Technologies Corporation, the assignee of this patent application) is incorporated herein by reference. Suffice it to say, that in the preferred embodiment the engine on which this invention is being utilized, is a fan-jet axial flow compressor multi-spool type. As noted in FIG. 2 the compressor section generally indicated by reference numeral 10 is comprised of a plurality of compressor rotors 12 retained in drum rotor 14, where each rotor includes a disk 16 supporting a plurality of circumferentially spaced compressor blades 18. The rotors 12 are suitably supported in an outer engine case 20 and an inner case 22.

In this configuration a portion of the outer case 20 is fabricated in two axial circumferential halves and the other portion is fabricated in a full hoop generally cylindrically shaped case. In FIG. 2 the first four lower pressure stages as viewed from the left hand side are housed in the split case and the last three stages are housed in the full case.

Inasmuch as this invention pertains to the aft section (full case) of the compressor, for the sake of simplicity and convenience only the portion of the compressor dealing with the full case will be discussed hereinbelow. The inner case 22 which comprises the stator vanes 30 and outer air seal 32 are supported in the full case 34 via the dog-jaw hook connection 36 and the backbone 38 which carries suitable attaching flanges 40 and 42.

As was mentioned above, the problem associated with this construction is that the cavity 44 between the inner case 22 and outer case 34 is ultimately pressurized by the fluid leaking therein from the engine flow path. The engine flow path is defined by the annular passageway bounded by the inner surface of the inner case 22 and outer surface of drum rotor 14. This pressure can reach levels up to 650 pounds per square inch (PSI). Should a surge situation occur, the pressure level in the gas path can reduce instantaneously to a value much lower than the 650 PSI and since the pressure in cavity 44 is trapped and can only be reduced gradually, an enormous pressure differential exists across inner case 22.

The spool/bolt arrangement generally illustrated by reference numeral 50 ties the inner case 22 to outer case 34 in such a manner as to enhance fatigue life and provide sufficient strength to withstand the compressor surge problems. Spool/bolt 50 comprises a spool member 52 having a reduced diameter threaded portion 54 at its lower extremity adapted to be threaded onto the complementary internal threads 56 formed in boss 58 extending radially from the outer surface 60 of inner case 22.

The bolt 62 comprises a relatively long shank 64 carrying threads 65 at the lower extremity and a significantly large head 66. Head 66 may be hexagonally shaped and is thicker and has a larger diameter than otherwise would be designed for this particular sized shank. These unusual dimensions of the head serve to reduce the stress concentration and increase fatigue life of the head to shank fillet adjacent the head.

The bolt 62 fits into bore 70 centrally formed in spool 52 that terminates just short of the remote end of the entrance to the bore. The inner diameter of bore 70 is threaded to accommodate the threaded portion of bolt 62. The spool 52 carries a tool receiving portion 72 for threadably securing the spool to inner case 22.

In the assembled condition, the spool 52 is threaded to inner case 22 and the bolt 62 passing through opening 74 in the outer case 34 is threaded to the inner threads of the spool 52, until the head bears against the outer surface of outer case 34 or a suitable washer. Tab washer 76 may be employed to prevent the bolt from inadvertently retracting.

After the spool is torqued sufficiently to urge flange portion 78 to bear against inner case 22, the bolt 62 is sufficiently torqued so that the flange-like portion 80 of the spool bears against the inner surface of outer case 34. The amount of torque will depend on the particular application but it should be sufficient to keep spool 52 in compression throughout the operating range of the engine.

As is apparent from the foregoing, the spool serves as a compressed flange-like member thus reducing both bolt fatigue and surge stresses. This configuration resists fatigue loads occasioned by thermal axial deflection differences between outer case 34 and the segmented inner case 22.

Also apparent from the foregoing and mentioned above is this arrangement resists the radial loads occasioned by a surge when there is an instantaneous and nearly complete loss in compressor flow path pressure.

The spool 52 also makes the threads 54 that mates with the inner case 22 to be insensitive to fatigue loading because it is preloaded by the spool washer face 84 that bears against the inner case.

The thread sizes of threads 65 of bolt 62 and threads 54 of spool 52 are different (the threads 54 are specifically designed to be larger). Because the diameter of the spool threads 54 are larger it has a higher disassembly breakaway torque than bolt 62. Consequently, the bolt will, by design, loosen first.

According to this invention the backbone 38 is a load carry member and is generally annularly shaped forming a relatively straight piece but having a radially extending lower portion 40, an angularly extending middle portion 92 and another radially extending upper portion 42. As mentioned earlier the extremities, i.e. the lower and upper portions 40 and 42 serve basically as flanges and are adapted to be bolted to the inner and upper cases 22 and 20, respectively. The forward face of the lower portion 40 is recessed 100 to accept the radially extending flange 94 integrally formed on the rear end of the inner segmented case 22, forming a somewhat tongue-in-groove arrangement. The inner diameter 96 of backbone 38 is dimensioned so that it snugly fits onto the upper surface of the next adjacent stator vane assembly 98 which serves to reduce scrubbing of the case tied assembly, just described.

Although the invention has been shown and described with respect to detailed embodiments thereof, it will be understood by those skilled in the art that various changes in form and detail thereof may be made without departing from the spirit and scope of the claimed invention.

We claim:

1. Mounting apparatus for an axial compressor for a gas turbine engine including a drum rotor having a plurality of rows of circumferentially spaced compressor blades and a stator supporting a plurality of rows of circumferentially spaced vanes with each row being disposed adjacent a row of compressor blades, said stator defining an inner case, said inner case and said drum rotor defining a boundary for the gas turbine engine's gas path, a concentrically disposed cylindrically shaped outer case, support means for supporting the aft end relative to the flow of said gas path of said stator to said cylindrically shaped outer case, said support means being generally annular shaped and having a relatively straight section extending through a plane in close proximity to its points of attachment wherein said support means is a load carrying member.

2. Mounting apparatus as claimed in claim 1 wherein the end portions adjacent the outer diameter and inner diameter of said support means being slightly angled to define flange-like sections at the points of attachment.

3. Mounting apparatus as claimed in claim 2 wherein the inner case being formed from a plurality of arcuate segments includes on each segment a radially extending flange disposed at its aft end, said flange being dimensioned to fit into an annular complementary groove formed in the adjacent face of said inner diameter flange-like section.

4. Mounting apparatus including an axially spaced vane including an outer shroud disposed immediately downstream of the aft end of said inner case, the outer diameter of said shroud and the end surface on the inner diameter of said annular shaped support means being in frictional relationship for minimizing the scrubbing effect between said inner case, said outer case and the attachment surfaces.

5. Mounting apparatus as claimed in claim 4 wherein said outer case comprises a plurality of axially disposed complementary cases including fore-mounted complementary cases being split to form complementary halves and an aft mounted complementary case being a full unitary hoop.

* * * * *